Nov. 15, 1932.  S. WIDMER  1,887,830
PROTECTION AND CONTROL OF RECTIFIERS
Filed March 17, 1928
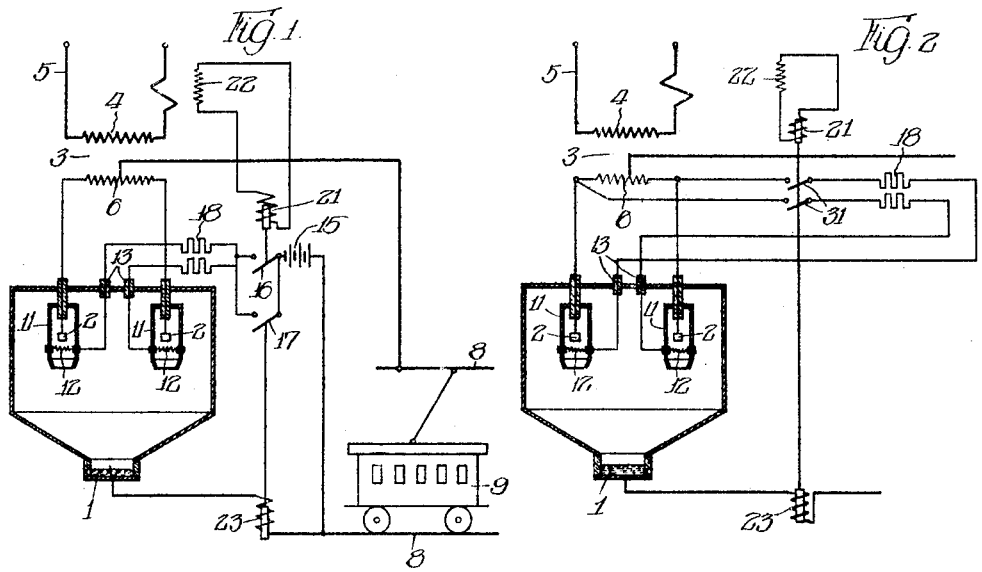
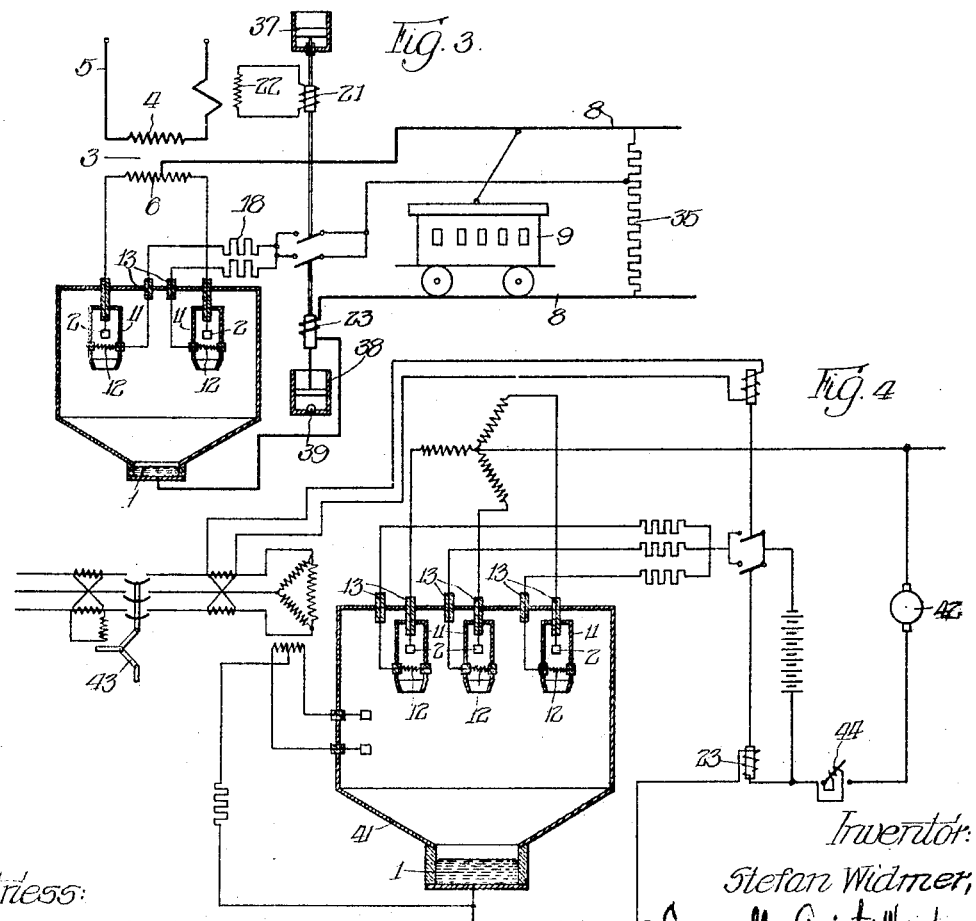
Witness:
R. Burkhardt
Inventor:
Stefan Widmer,
By Cromwell, Greist & Warden
attys Patented Nov. 15, 1932

1,887,830

UNITED STATES PATENT OFFICE

STEFAN WIDMER, OF BADEN, SWITZERLAND, ASSIGNOR TO AKTIENGESELLSCHAFT BROWN BOVERI & CIE., OF BADEN, SWITZERLAND, A JOINT STOCK COMPANY OF SWITZERLAND

PROTECTION AND CONTROL OF RECTIFIERS

Application filed March 17, 1928, Serial No. 262,514, and in Germany March 28, 1927.

This invention relates to the protection and control of rectifiers and it has among its objects the provision of improved methods and means for protecting rectifiers, particularly those of the mercury vapor type, against damage by reason of back-fire or short circuit in the interior of the rectifier.

I found that while it is very difficult to stop the back-fire current in a rectifier, it is possible to make such back-fire harmless to the rectifier and the remainder of the installation by producing in the interior of the rectifier a condition which will make it impossible for the anodes which are not active at the occurrence of the back-fire to further participate in the rectifying action or, in general, prevent the same from becoming active in the further course of the rectifying cycle by providing the anodes with protective screens or grids. In case of a back-fire or abnormal condition within the rectifier, the grids or screens of the anodes are charged so as to prevent the initiation of current flow to the respective anodes, particularly to the anodes which have a positive potential. This limits the current flow in the rectifier only to the electrodes which participated in the back-fire and this current will stop at the next reversal of the current when going through zero.

The undesirable flow of back-fire current is thus limited to a very short period and as a consequence the rectifier will be saved from damage and may immediately be returned to operation upon stoppage of the rectifier.

The foregoing and other objects of the invention will be best understood from the following description of exemplifications thereof, reference being had to the accompanying drawing, wherein Figs. 1 to 4 are diagrammatic views of rectifier systems embodying various forms of the invention.

In order to protect single or multi-phase rectifiers against the effects of short circuits, high-speed switches or circuit breakers are provided on the direct current side of the rectifier. These switches must be designed to carry the full short circuit power and interrupt the short circuit current by momentarily disconnecting the rectifier from the direct current mains. The continual increase in the size of power rectifiers and the concentration of power in parallel operating units imposes very high duties on these high-speed switches and requires circuit breakers of very high rupturing capacity, thereby greatly increasing the cost of the plant. Moreover, on account of the heavy moving parts of such switches, it is difficult to obtain the required breaking speeds and there is a danger of the rectifiers and the associated apparatus being damaged by heavy short circuits.

It was formerly believed that the effects of a short circuit in a rectifier could be rendered harmless by interrupting the current flowing from the cathode to the negative anode which had back-fired, this being accomplished by providing the anodes with grids or protective screens and applying to the grid of the back-firing anode a potential equal or negative with respect to said element, which, of course, functions at that moment as a cathode under reverse current conditions. This type of protection has proved to be inadequate, probably due to the fact that heavy positive ions travel under such conditions toward the anode which has back-fired and the charged grid is not sufficient to disperse or retard these ions to the desired extent, thus failing to stop the flow of back-fire current.

According to my invention I do not attempt to stop the flow of back-fire current to the back-firing anode, but avoid damage to the rectifier and the associated apparatus of the installation by cutting off current flow to the other anodes or electrodes of the rectifier, thereby stopping the back-fire condition at the moment when the current from the back-firing anode reverses at the next passing through zero.

In the course of my investigation of the back-fire conditions I found that complete interruption of the current within the rectifier can only be obtained by reversing the sign of the potential and current of the anode which occurs when "forward" current, that is, current in the normal rectifying direction, commences to flow. In these circumstances only comparatively light electrons travel toward the anodes and such electrons may be dispersed and their motion retarded by applying to the anode grids a potential equal or, still better, negative with respect to the cathode. This method of protection and control is particularly effective when the "forward" current is in its incipient stages, and under such conditions the arc can be extinguished at the latest within the period of time which elapses from the commencement of the back-fire to the reversal of current in the anode at which the back-fire occurs. Thus, the reverse back-fire arc will not persist longer than this very short period which is a fraction of the duration of a single cycle of the alternating current source.

In carrying the invention into effect in connection with single-phase or multi-phase rectifiers, the anodes of the rectifiers are provided with grids or screens. On occurrence of a backfire, a potential which is equal or preferably negative with respect to the cathode is applied to all the anode grids and particularly to those associated with anodes which are positive. This control voltage may be applied to the grid either by hand, for example, using push button control, or, preferably, automatically by means of relays responsive to short circuit conditions within the rectifier or to abnormal conditions therein. These relays may be located either in the primary or secondary circuits of the transformer feeding the rectifier or in the direct current circuit thereof. The grids may be charged with either direct or alternating current, the direct current being obtained either from the direct current mains or from some independent source, and the alternating current being obtained either from the rectifier transformer or from an auxiliary transformer specially provided for the purpose. It is important that the grids shall be charged to a potential that is negative with respect to the cathode.

A system to which one form of my invention has been applied is illustrated in Fig. 1 wherein a mercury vapor rectifier of the metal tank type is provided with a mercury cathode 1 and two main anodes 2. Alternating current is supplied to the rectifier by means of a transformer 3 having a primary winding 4 connected to an alternating-current supply line 5 and a secondary winding 6 connected to the anodes 2. Direct current mains 8 in the form of a trolley line and a return conductor are connected, respectively, to the midpoint of the secondary transformer winding 6 and the cathode 1 of the rectifier. A load in the form of an electrically propelled trolley vehicle 9 is shown connected between the direct current mains 8.

In order to secure the desired protection against damage by back-fire, each anode is provided with a grid or protective screen. In the embodiment of the invention shown in the drawing the protective screen or grid includes a tubular chamber 11 of metal that is open towards the mercury cathode. Mounted transversely across said opening is a grid structure 12 in the form of a screen or the like. The grid structure is preferably insulated from the walls of the tubular chamber 11 and is connected to a lead terminal 13 by means of which the potential applied to the grid may be controlled from outside of the rectifier. A source of control potential, such as a battery 15, has its positive terminal connected to the cathode 1 of the rectifier and is arranged to have its negative terminal connected by means of either one of two switches 16, 17 to the control grids 12 of the two anodes 2. One terminal of each of the switches 16, 17 is connected to the negative terminal of the control source 15, and the other terminal of each of the switches 16, 17 is connected to the lead terminals from the grid 12, current-limiting resistors 18 being provided in the leads so as to prevent excessive current flow to the grids. The grid control switch 16 is controlled by a relay 21 adapted to be actuated from a current transformer 22 in response to the flow of excess current to the main supply transformer 3 of the rectifier. The second grid control switch 17 is arranged to be actuated by a relay 23 in response to a flow of excess current in the direct current mains leading from the rectifier.

Should the current in the current transformer 22 exceed the prescribed value by reason of a short circuit in the rectifier, relay 21 is actuated closing the grid control switch 16. This applies a negative potential to the control grid and, as a result, the current flow to the rectifier will be stopped and the backfire arc extinguished within a half cycle of the alternating current supply source at the next zero of the current flow from the backfiring anode. Overloading the rectifier by reason of a short circuit, or the like, on the direct-current mains is likewise prevented without the use of special high-speed switches by the action of the relay 23. In case of an overload this relay closes the grid control switch 17, thereby applying to the control grids 12 of the anodes a negative potential so as to prevent further current flow in the rectifier, thereby stopping flow of current to the short circuit on the mains.

In Fig. 2 the control potential for the anodes is derived by connecting the grids associated with the anodes to points of the supply transformer having a potential which is equal or more negative than the potential of the cathode. For instance, each grid is arranged to be connected to an anode that is in phase opposition with the anode associated with respect to the grid. As in the arrangement shown in Fig. 1, the connection of the grids to the anodes is effected by means of switches 31 adapted to be closed either in response to an excess current flow from the supply transformer 3 or an overload in the direct-current mains.

In the arrangement shown in Fig. 3 the control voltage for the grids 12 is obtained by means of a potential divider in the form of a potentiometer resistor 35 connected between the direct-current mains, the arrangement being otherwise similar to that described in connection with Fig. 1.

As a general rule the relays 21 and 23 are set to operate instantaneously so as to avoid unnecessary flow of heavy short circuit current through the rectifier. However, sometimes it may be advantageous to use the arrangement as a part of overload protection, the relays being arranged to operate on overload with a suitable time delay, preferably inverse with the magnitude of the overload. This is indicated by the dash pot 37 on the relay 21 of the arrangement shown in Fig. 3. Of course, instead of the dash pot 37 some other damping device may be used.

The relays are preferably arranged so as to return to the normal position after the short circuit has been cleared. It is often desirable that while the closure of the grid control switches shall be effected rather quickly, the opening thereof shall be delayed so as to give the rectifier or the system time to return to normal condition. To this end, the relays may be associated with time delay mechanisms which prolong the time required to return the relays to the normal condition, such arrangement being shown in the form of a dash pot 38 associated with the overload relay 23 in the direct-current mains. On occurrence of an overload the armature of the relay 23 will be quickly pulled up, the ball valve 39 permitting quick upward movement of the relay armature. The return movement of the relay armature will, however, be rather slow by reason of the closure of the opening at the ball valve in the dash pot 38.

In Fig. 4 the invention is shown applied to a rectifier system utilizing a polyphase rectifier 41, the complete system including also additional current generating devices such as rotary converters 42 connected in parallel with the rectifier 41 across the direct-current mains, a circuit breaker 43 for disconnecting the main supply transformer from the alternating current source, and a high-speed circuit breaker 44 for disconnecting the faulty rectifier from the parallel-connected direct current generating means.

Stoppage of the back-fire by applying a stopping potential to the anode grids in response to the occurrence of a backfire or short circuit is important and of advantage not only in cases such as shown in Figs. 1 to 3 where no additional current generating devices are connected in parallel to the rectifier mains, but is also of advantage in systems such as shown in Fig. 4 in which independent direct-current generating means are connected in parallel to the rectifier. It is in such cases, namely, possible to greatly reduce the magnitude of the short circuit current flowing within the rectifier by stopping the current flow from the alternating-current source through the application of a control potential to the grids of the sound anodes. This very often stops the reverse current flow from the parallel current generating means through the cathode to the back-firing anode of the rectifier, and in any case it reduces the duty on the high-speed circuit breaker 44 in the direct-current mains and hastens the reestablishment of normal operating conditions in the rectifier.

The term "grid" as used herein is not intended to be limited to a grid shaped or perforated type electrode, but is intended to be applied in its broad scope to designate broadly any of the various types of control electrodes that permit current to pass to the controlled electrode, but are capable of controlling the electrical conditions in the space in front of the controlled electrode.

The invention is not limited to the particular details of constructions, methods and arrangements described hereinabove but is susceptible of many other modifications which will suggest themselves to those skilled in the art. It is accordingly desired that the appended claims be given a broad construction commensurate with the scope of the invention.

I claim:

1. The method of protecting gaseous type rectifiers from the effects of short circuits on the direct current side under utilization of anode grids which comprises normally maintaining said grids at potentials at which current flows freely to the cathode from the anodes of positive potential and applying, in the event of a fault, to the grid means associated with the anode means of positive potential a potential that is negative with respect to the cathode.

2. The method of protecting gaseous type rectifiers from the effects of short circuits on the direct current side under utilization of anode grids which comprises applying, in the event of a fault, to the grids of all the anodes of positive potential a potential that is negative with respect to the cathode.

3. The combination with a rectifier of the gaseous type comprising a cathode, an anode, and a grid interposed between the cathode and anode, of means responsive to abnormal current flow conditions in the rectifier for applying to the grid a potential negative with respect to the cathode irrespective of the momentary potential of the anode.

4. The combination with a rectifier of the gaseous type comprising a cathode, a plurality of anodes, and grid means associated with said anodes, of means responsive to abnormal current flow conditions in said rectifier for applying to said grid means a potential more negative than the potential of said cathode.

5. The combination with a rectifier of the gaseous type comprising a cathode, a plurality of anodes, and grid means associated with said anodes, of relay means responsive to abnormal current flow conditions between the anodes in said rectifier for applying to said grid means a potential more negative than the potential of said cathode.

6. The combination with a rectifier of the gaseous type including a cathode, an anode, a grid interposed between said cathode and anode, an alternating-current supply source connected to said rectifier, and direct-current leads connected to said rectifier, of relay means responsive to abnormal current flow from the alternating current supply source into said rectifier for applying to said grid a potential negative with respect to said cathode.

7. The combination with a rectifier of the gaseous type including a cathode, an anode, a grid interposed between said cathode and anode, an alternating-current supply transformer connected to said rectifier, and direct-current leads connected to said rectifier, of relay means responsive to abnormal current flow through said transformer for applying to said grid a potential negative with respect to said cathode.

8. The combination with a rectifier of the gaseous type including a cathode, an anode, a grid interposed between said cathode and anode, an alternating-current supply transformer connected to said rectifier, and direct-current leads connected to said rectifier, of relay means responsive to abnormal current flow through said direct-current leads for applying to said grid a potential negative with respect to said cathode.

9. The combination with a rectifier of the gaseous type including a cathode, an anode, a grid interposed between said cathode and anode, an alternating-current supply transformer connected to said rectifier, and direct-current leads connected to said rectifier, of relay means responsive to abnormal current flow through said transformer and said direct-current leads for applying to said grid a potential negative with respect to said cathode.

10. The combination with a rectifier of the gaseous type including a cathode, an anode, a grid interposed between said cathode and anode, an alternating-current supply transformer connected to said rectifier, and direct-current leads connected to said rectifier, of relay means responsive to abnormal current flow in said rectifier for applying to said grid a potential negative with respect to said cathode, and means for delaying the return of said grid to the normal potential.

11. The combination with a rectifier comprising a mercury cathode, an anode, and a grid interposed between said cathode and anode, of means responsive to abnormal current flow conditions in the rectifier for applying to the grid a potential negative with respect to the cathode irrespective of the momentary potential of the anode.

12. The combination with a rectifier comprising a mercury cathode, a plurality of anodes cooperating with said cathode, and grid means interposed between said cathode and said anodes, of means responsive to abnormal current flow conditions between said anodes in the rectifier for applying to the grid means a potential negative with respect to the cathode.

13. The combination with a rectifier comprising a mercury cathode, a plurality of anodes cooperating with said cathode, and grid means interposed between said cathode and said anodes, of means responsive to abnormal current flow conditions in the rectifier for applying to the grid means a potential negative with respect to the cathode, and means for delaying the return of said grid means to the normal potential condition thereof.

14. The method of protecting rectifiers of the mercury vapor type from the effects of back-fire under utilization of grids interposed between the cathode and anodes which comprises applying, in the event of back-fire, to said grids a potential that is negative with respect to the cathode.

15. The method of protecting mercury vapor rectifiers of the type utilizing a cathode, a plurality of anodes cooperating with the cathode, and grids interposed between said cathode and said anodes which comprises applying, in the event of back-fire, to all of said grids a potential that is negative with respect to said cathode.

In testimony whereof I have hereunto subscribed my name this 28th day of February, A. D. 1928, at Zurich, Switzerland.

STEFAN WIDMER.